United States Patent
Wang et al.

(10) Patent No.: US 9,657,369 B2
(45) Date of Patent: May 23, 2017

(54) MONAZITE BALLAST SEPARATION AND RECOVERY METHOD

(71) Applicant: YIYANG HONGYUAN RARE EARTH CO., LTD, Hunan (CN)

(72) Inventors: Qi Wang, Hunan (CN); Yuehua Chen, Hunan (CN); Xiaozhen Cui, Hunan (CN); Ping Ren, Hunan (CN); Keqin Liu, Hunan (CN); Geming Xu, Hunan (CN); Weiquan Guo, Hunan (CN); Yan Zhu, Hunan (CN)

(73) Assignee: YIYANG HONGYUAN RARE EARTH CO., LTD, Hunan (CN)

( * ) Notice: Subject to any disclaimer, the term of this patent is extended or adjusted under 35 U.S.C. 154(b) by 16 days.

(21) Appl. No.: 14/647,368

(22) PCT Filed: Jul. 24, 2013

(86) PCT No.: PCT/CN2013/080002
§ 371 (c)(1),
(2) Date: May 26, 2015

(87) PCT Pub. No.: WO2014/082461
PCT Pub. Date: Jun. 5, 2014

(65) Prior Publication Data
US 2015/0307958 A1 Oct. 29, 2015

(30) Foreign Application Priority Data
Nov. 27, 2012 (CN) .......................... 2012 1 0489704

(51) Int. Cl.
| | |
|---|---|
| C22B 7/00 | (2006.01) |
| C22B 7/04 | (2006.01) |
| C22B 59/00 | (2006.01) |
| C22B 60/02 | (2006.01) |
| C22B 3/42 | (2006.01) |
| C22B 3/06 | (2006.01) |
| C22B 3/08 | (2006.01) |
| C22B 34/14 | (2006.01) |

(52) U.S. Cl.
CPC ............. *C22B 7/04* (2013.01); *C22B 3/065* (2013.01); *C22B 3/08* (2013.01); *C22B 3/42* (2013.01); *C22B 7/007* (2013.01); *C22B 34/14* (2013.01); *C22B 59/00* (2013.01); *C22B 60/02* (2013.01); *C22B 60/026* (2013.01); *C22B 60/0234* (2013.01); *C22B 60/0239* (2013.01); *C22B 60/0265* (2013.01); *C22B 60/0291* (2013.01); *Y02P 10/234* (2015.11)

(58) Field of Classification Search
CPC .. C22B 7/04; C22B 7/007; C22B 3/42; C22B 3/08; C22B 3/065; C22B 60/0234; C22B 60/0291; C22B 60/0239; C22B 60/0265; C22B 60/026; C22B 59/00; C22B 34/14
USPC .................... 423/6, 7, 10, 20, 21.5
See application file for complete search history.

(56) References Cited

U.S. PATENT DOCUMENTS

| | | | |
|---|---|---|---|
| 2,815,264 A | 12/1957 | Calkins et al. | |
| 4,461,748 A * | 7/1984 | Sabot ................... | C22B 3/0052 423/10 |

FOREIGN PATENT DOCUMENTS

| | | |
|---|---|---|
| CN | 1721559 A | 1/2006 |
| CN | 101886175 A | 11/2011 |
| CN | 103014359 A | 4/2013 |
| GB | 783628 A | 12/1957 |

OTHER PUBLICATIONS

Zou, Dong; Research on separation of uranium, thorium and rear earth in monazite by 1-4 extraction, Journal of Guangdong Non-Ferrous Metals, May 1992, vol. 2, No. 1, pp. 16-21, ISSN 1673-9981 (English Abstract provided).
International Search Report issued in a corresponding PCT/CN2013/080002 on Oct. 31, 2013.

* cited by examiner

*Primary Examiner* — Steven Bos
(74) *Attorney, Agent, or Firm* — Roberts Mlotkowski Safran Cole & Calderon, P.C.

(57) ABSTRACT

The invention relates to a separation and recovery method for radioactive waste slag and specifically relates to a separation and recovery method for monazite slag. The separation and recovery method comprises the following steps: acid leaching, pressure filtration, water washing, extraction of valuable components and treatment of filtration slag. The separation and recovery method provided by the invention performs low-acid and low-temperature leaching on monazite slag, so that a liquid phase and a solid phase are easy to separate; after an ore dressing process is adopted for performing ore dressing and alkali decomposition on secondary slag, closed-loop circulation and recovery of uranium, thorium and rare earth is realized; and simultaneously, extraction raffinate waste acid is recycled, so that the emission of waste water is reduced, the consumption of sulfuric acid and fresh water and the treatment cost of the waste water are reduced, the production cost is reduced, the recovery rate of the valuable elements, namely the uranium, the thorium and the rare earth is more than 97%, and the whole process has no emission of the radioactive waste water and waste slag.

8 Claims, No Drawings

MONAZITE BALLAST SEPARATION AND RECOVERY METHOD

CROSS-REFERENCE TO RELATED APPLICATIONS

The present application is a U.S. National Phase of PCT/CN2013/080002 filed on Jul. 24, 2013 claiming priority to Chinese Patent application No. 201210489704.0 filed Nov. 27, 2012. The entire disclosure of the PCT Application is hereby incorporated by reference into the present Application.

FIELD OF THE INVENTION

The invention relates to a separation and recovery method for radioactive waste slag, specifically relates to a separation and recovery method for monazite slag and particularly relates to a method for separation and recovery of valuable elements, namely uranium, thorium and rare earth, as well as monazite concentrate and zirconite concentrate from monazite slag.

BACKGROUND OF THE INVENTION

Monazite is one of four major raw materials of rare earth industry in China. The monazite is mainly contained in beach placers of Guangdong, Guangxi and Hainan Island and mainly associated with zirconium, titanium and other minerals; and there are monazite ores inland, for example, a super-large monazite mine exists in Gangkou, Yueyang, Hunan. The monazite belongs to light rare earth ores. The existing production process is as follows: performing alkali decomposition on monazite concentrate, and extracting useful rare earth and phosphorus from material liquid, wherein the remaining solid products, i.e. monazite slag, contain about 16-28% of $ThO_2$, 0.6-1.2% of U and 9-20% of REO, as well as the monazite, zirconite, rutile and other useful minerals, which are not decomposed. As how to make thorium with the highest content more useful has not been found out, no attention is paid to the recovery of these monazite slag, and these monazite slag become a heap of troublesome radioactive waste slag, which is not conductive to environment-friendly management and also becomes an insurmountable obstacle in survival and development of a rare earth plant taking the monazite as raw material. At present, there is about 50,000 tons of monazite slag all over China, and nearly 10,000 tons of mineral slag is produced annularly; and if the management is not regulated, the environment will be greatly harmed.

Any discussion of the prior art throughout the specification should in no way be considered as an admission that such prior art is widely known or forms part of common general knowledge in the field.

It is an object of the present invention to overcome or ameliorate at least one of the disadvantages of the prior or to provide a useful alternative.

SUMMARY OF THE INVENTION

According to a first aspect, the present invention provides a separation and recovery method for monazite slag comprising the following steps:

(1) acid leaching: adding monazite slag into a 0.25 mol/L-0.5 mol/L inorganic strong acid solution according to a monazite slag/acid ratio of 1 kg:(1-15) L, heating to 40° C.-100° C., stirring for 5 h-8 h, cooling, standing, and siphoning the supernatant liquid to obtain the supernatant liquid containing uranium, thorium and rare earth elements and slurry;

(2) pressure filtration: filtering the slurry to obtain filtration slag and filtrate, and merging the filtrate with the supernatant liquid in the step (1);

(3) water washing: adding water into the filtration slag in the step (2) to wash, stopping washing when the pH value of a water washing solution is 2-3, and dry-pressing the filtration slag to obtain a water washing solution and secondary slag; and merging the water washing solution with the supernatant liquid in the step (1) to obtain a mixed water solution.

According to a second aspect, the present invention provides a product obtained by the method of the first aspect.

Unless the context clearly requires otherwise, throughout the description and the claims, the words "comprise", "comprising" and the like are to be construed in an inclusive sense as opposed to an exclusive or exhaustive sense; that is to say, in the sense of "including, but not limited to".

Against the insufficiencies of the prior art, the invention aims at:

1. providing a separation and recovery method for monazite slag to separate valuable components in the monazite slag into a liquid phase (filtrate containing uranium, thorium and rare earth) and a solid phase (filtration slag).

2. providing a separation and recovery method for monazite slag to recover valuable elements, namely the uranium, the thorium and the rare earth from the liquid phase.

3. providing a separation and recovery method for monazite slag to perform ore dressing treatment on the solid phase to obtain monazite concentrate, zirconite concentrate and tailings and realize closed-loop circulation of radioactive substances, wherein the produced small amount of filtration slag is (zircon), and the whole process has no discharge of radioactive waste water and waste slag.

In order to realize the above purposes, the technical scheme of the invention is as follows:

A separation and recovery method for monazite slag comprises the following steps:

(1) acid leaching: adding monazite slag into a 0.25 mol/L-0.5 mol/L inorganic strong acid solution according to a monazite slag/acid ratio of 1 kg:(1-15) L, heating to 40° C.-100° C., stirring for 5 h-8 h, cooling, standing, and siphoning the supernatant liquid to obtain the supernatant liquid containing uranium, thorium and rare earth elements and slurry;

(2) pressure filtration: filtering the slurry to obtain filtration slag and filtrate, and merging the filtrate with the supernatant liquid in the step (1);

(3) water washing: adding water into the filtration slag in the step (2) to wash, stopping washing when the pH value of a water washing solution is 2-3, and dry-pressing the filtration slag to obtain the water washing solution and secondary slag; and merging the water washing solution with the supernatant liquid in the step (1) to obtain a mixed water solution.

The mixed water solution contains the uranium, the thorium and the rare earth elements, and the secondary slag is the filtration slag containing monazite, zirconite and the remaining uranium, thorium and rare earth compounds.

In order to improve the recovery rate of the valuable elements, namely the uranium, the thorium and the rare earth, secondary acid leaching is preferably performed after the step (1): adding a 0.25 mol/L-0.5 mol/L inorganic strong acid solution into the slurry according to a monazite slag/acid ratio of 1 kg:(1-3) L, heating to 40° C.-100° C., stirring for 5 h-8 h, cooling, standing, siphoning the supernatant liquid, and merging into the supernatant liquid containing the uranium, the thorium and the rare earth elements, obtained in the step (1).

Further preferably, acid washing is performed after secondary acid leaching: adding a 0.10 mol/L-0.25 mol/L inorganic strong acid solution into the slurry according to a monazite slag/acid ratio of 1 kg:(1-3) L, heating to 40° C.-100° C., stirring for 0.5 h-1 h, cooling, standing, siphoning the supernatant liquid, and merging into the supernatant liquid containing the uranium, the thorium and the rare earth elements, obtained in the step (1).

Preferably, the cooling and standing time is above 4 h, and more preferably, the cooling and standing time is 4-8 h.

Preferably, the inorganic strong acid is sulfuric acid or nitric acid.

Further preferably, extraction of the valuable components is performed on the mixed water solution containing the uranium, the thorium and the rare earth elements, obtained in the step (3), including the following steps A. uranium extraction: extracting the uranium from the mixed water solution obtained in the step (3) by adopting an ion exchange adsorption method to obtain solid sodium diuranate and a solution containing the thorium and the rare earth;

B: thorium extraction: using a mixture A of di(2-ethylhexyl)phosphoric acid (commonly known as P204) and kerosene as an extraction agent, wherein the mass percent of the di(2-ethylhexyl)phosphoric acid in the mixture A is 25%-35%; and extracting the thorium from the solution containing the thorium and the rare earth in the step A by adopting an extraction method to obtain solid thorium hydroxide and a rare earth solution;

C: rare earth extraction: using a mixture B of primary amine (commonly known as N1923, secondary octanol and kerosene as an extraction agent, and extracting the rare earth from the rare earth solution in the step B by adopting an extraction method to obtain a rare earth chloride solution and a waste acid solution, wherein in the mixture B, the mass percent of the primary amine is 5%-15%, the mass percent of the secondary octanol is 3%-6%, and the balance is the kerosene.

Wherein, in order to reduce the discharge of industrial waste water and save the production cost, the waste acid solution produced in the step C is preferably returned to the step (1) for being used as an acid leaching solution.

Then, further preferably, treatment is performed on the secondary slag in the step (3): performing ore dressing on the secondary slag to obtain monazite concentrate, zirconite concentrate and tailings, sending the tailings into a monazite concentrate treatment process for treatment after alkali decomposition, and further sending the monazite slag produced by the monazite concentrate treatment process into the step (1) for treatment, so that the closed-loop circulation and recovery of the radioactive substances is realized and the production process has no discharge of radioactive waste slag.

How to perform an ore dressing on the secondary slag is known to the skilled person in the art. It has the same ore dressing steps with the method for the monazite slag except that raw materials are different for ore dressing and the ore dressing is performed on the secondary slag in the step (3) instead, comprising the following specific steps: performing gravity separation on the secondary slag (by a shaking table or a centrifugal ore dressing machine) to separate out heavy ore (mineral sand) and the tailings (compounds), further performing gravity separation on the heavy ore (by the centrifugal ore dressing machine or the shaking table) to eliminate gangue in the heavy ore, and further performing magnetic separation-electric separation to separate out the zirconite concentrate and the monazite concentrate.

The invention is further explained and illustrated below.

According to the separation and recovery method provided by the invention, the U, the Th and the RE are separated and extracted by a combined process of ore leaching, resin uranium extraction, P204 thorium extraction, N1923 RE extraction and returning of extraction raffinate to ore leaching, the whole combined process can be performed continuously and smoothly without preparation of the solution, the process flow is simplified, and the emission of waste water is simultaneously reduced. Through the combined process of extracting the Th by adopting P204 and extracting the RE by adopting N1923 from the raffinate after U extraction, two products, namely the Th and the RE are obtained. Simultaneously, as the content of impurities in the extraction raffinate (waste acid) is very low, the extraction raffinate can be returned to the acid leaching process step for re-utilization, the discharge amount of the waste water is reduced, the using amount of the acid for acid leaching and fresh water is saved, the treatment cost of the waste water is reduced, and the production cost is reduced. However, in the conventional method, the N1923 is firstly used for extracting the Th, and then the P204 is used for extracting the RE. The shortcomings are as follows: by using the expensive N1923 to extract the large amount of Th, the consumption of the extraction agent is high, and the cost is uneconomical. The P204 is further used for extracting the rare earth, although the cost of the extraction agent is a bit lower, the rare earth content in the raffinate after extraction is low, the acidity is relatively high, the extraction can only be performed by reducing the acidity, and alkali for regulating the acidity needs to be consumed (the problem can be avoided by using the N1923 to extract the rare earth). Furthermore, the acidity of the extraction raffinate is low after the solution with the reduced acidity is subjected to extraction of the rare earth by adopting the P204, so that the extraction raffinate can not be returned for acid leaching and can only be discharged after treatment, and the discharge amount of the waste water and the treatment cost of the waste water are increased. The acid and raw water in the acid leaching process step can not be saved. We skillfully exchange the using objects of the two extraction agents to form the combined process so as to obtain favorable effects, which forms another innovation point of the process.

The technical principles of the invention are as follows:

The chemical method is adopted for treatment of the monazite slag so as to extract the uranium, the thorium, the rare earth and other valuable elements. The ore dressing method is used for recovering the monazite, the zirconite and other valuable minerals, which are not decomposed, from the slag. The discharge of the radioactive waste water and waste slag is avoided. This green circulation is realized. The specific principles are as follows:

I. Acid dissolution: the invention adopts a low-acid and low-temperature leaching process to selectively leach the decomposed valuable elements, namely the uranium, the thorium and the rare earth compounds in the monazite slag into the solution, so that a colloidal solution is not produced in the solution, colloid-like compounds do not appear in the slag. A liquid phase and a solid phase are easy to separate, and the clear water solution containing the uranium, the thorium and the rare earth and the secondary slag are obtained. By controlling the acidity, the acid-soluble compounds in the monazite slag can be fully dissolved, the dissolution of other insoluble compounds can be reduced to the greatest extent, and the solid-liquid separation of the acid-soluble slag can be smoothly performed.

(1)
$$2RE(OH)_3 + 3H_2SO_4 \xrightarrow{\Delta} RE_2(SO_4)_3 + 6H_2O$$

(2)
$$Th(OH)_4 + 2H_2SO_4 \xrightarrow{\Delta} Th(SO_4)_2 + 4H_2O$$

(3)
$$Na_2U_2O + 5H_2SO_4 \xrightarrow{\Delta} 2H_2UO_2(SO_4)_2 + Na_2SO_4 + 3H_2O$$
$$\rightarrow 4H^+ + 2UO_2(SO_4)_2{}^{2-}$$

Wherein, some impurities are further dissolved into the acid solution, and the reaction conditions are controlled to the greatest extent during the leaching process to enable the acid dissolution reaction of the U, the Th and the RE to be fuller than that of other impurities (Zr, Ti, Fe, Si and the like).

II. Extraction of the valuable elements: the U, the Th and the RE are separated and extracted by a combined process of ore leaching, resin uranium extraction, P204 thorium extraction, N1923 RE extraction and returning of extraction raffinate to ore leaching, the whole combined process can be performed continuously and smoothly without preparation of the solution, the process flow is simplified, and the emission of the waste water is simultaneously reduced.

1. Uranium Extraction 717 anion exchange resin $[R_4N]^+X^-$ is utilized for adsorbing and extracting the U.

(1) Exchange reaction:
$[R_4N]_2 \cdot SO_4]_s + UO_2(SO_4)_2{}^{2-} \rightarrow [(R_4N)_2 \cdot UO_2(SO_4)_2]_s + SO_4{}^{2-}$ (2) Hydrolysis:

$$2H_2UO_2(SO_4)_2 + 10NaOH \xrightarrow{\Delta} Na_2U_2O_7\downarrow + 4Na_2SO_4 + 7H_2O$$

2. Th extraction (1) Extraction

The P204 has different ion extraction capabilities, and the double solvents are adopted for extraction by utilizing the different extraction capabilities to achieve the purpose of separating the Th and the RE.

$Th^{4+} + [4(HA)_2]^\circ \rightarrow [Th \cdot (HA_2)_4]^\circ + 4H^+$
$RE^{3+} + [3(HA)_2]^\circ \rightarrow [RE \cdot 3(HA_2)]^\circ \ 3H^+$ An extraction complex contains $Th^{4+}$, $RE^{3+}$, $Ti^{4+}$, $Zr^{4+}$, $Fe^{3+}$, $TiO^{2+}$, $ZrO^{2+}$ and other ions; and in order to purify the Th, the sulfuric acid is firstly used for washing off rare earth ions and the ions thereafter. Therefore, the extraction complex containing the Th is purified.

(3) NaOH is used to perform back extraction on a Th-rich organic solution to obtain a thorium hydroxide enriched matter.

$$[Th \cdot (HA_2)_4]^O + 4NaOH \xrightarrow{\Delta} Th(OH)_4\downarrow + [4Na(HA_2)]^O$$

3. RE extraction Primary amine is utilized for extracting the rare earth in the raw material and separating the rare earth from the impurities.

(1) Association and extraction:

$$RE_2(SO_4)_3 + 3[(RNH_3)_2SO_4]^O \longrightarrow 2[(RNH_3)_3 RE(SO_4)_3]^O$$

(2) Back extraction of the rare earth:

$$[(RNH_3)_3 RE(SO_4)_3]^O \xrightarrow{HCl} 1.5[(RNH_3)_2SO_4]^O + RE^{3+} + 1.5 SO_4{}^{2-}$$

III. Treatment of the filtration slag: ore dressing is performed on the secondary slag through the ore dressing process to obtain the monazite, the zirconite and the tailings. The alkali decomposition process is used for performing alkali decomposition and acid dissolution on the tailings, then the tailings are further returned into the monazite alkali decomposition in main process.

IV. Treatment of the waste water (1) Recycling

The waste acid water is used for leaching the monazite slag after oil removal.

A uranium hydrolysis mother solution can be returned to the uranium leaching step after acidity regulation, so that reduces the emission of the waste water.

An alkali back extraction mother solution can be returned for further alkali back extraction after alkalinity regulation by alkali water.

(2) Neutralization Treatment:

The waste water to be discharged contains not only the acid, but also a large amount of $SO_4{}^{2-}$, and caustic soda is used as a neutralizing agent. The convenience is also provided for extracting the valuable elements from these wastes in the future. In order to ensure the up-to-standard emission of the waste water, before neutralization, oil removal is firstly performed on the acid-containing waste water, anion-cation resin exchange adsorption is further performed once to ensure up-to-standard emission of the waste water, and then the neutralization treatment is performed.

The process can comprehensively recover the uranium, the thorium, the rare earth, the zirconite and the monazite, and has no emission of the radioactive waste water and waste slag. The process is connected with a monazite alkali decomposition process, so that the production cost and the investment cost can be greatly reduced. The process has considerable economic benefits.

Compared with the prior art, the invention has the following advantages:

1. The low-acid and low-temperature leaching is adopted for the monazite slag, the decomposed valuable elements (U, Th and RE) in the monazite slag are leached into the solution, the liquid phase and the solid phase are easy to separate, and the solution is clear. The direct leaching rate of $ThO_2$ is more than 86%, the direct leaching rate of REO is more than 58% and the direct leaching rate of $U_3O_8$ is more than 82%. The leaching slag is easy to perform pressure filtration and washing.

2. The U, the Th and the RE are separated and extracted through the combined process of ore leaching, resin uranium extraction, P204 thorium extraction, N1923 RE extraction and returning of extraction raffinate to ore leaching, the whole combined process can be performed continuously and smoothly without preparation of the solution. The process flow is simplified, and the emission of the waste water is simultaneously reduced.

3. The ore dressing process is adopted for performing ore dressing and alkali decomposition on the secondary slag, then the closed-loop circulation and recovery of the uranium, the thorium and the rare earth is realized; and after alkali decomposition and acid dissolution of the tailings after ore dressing, the solution is returned into the monazite concentrate alkali decomposition main process to recover the uranium, the thorium and the rare earth, and the produced zirconium-rich tail slag can be directly sold as the monazite concentrate. The discharge of the radioactive waste slag is eliminated, and the comprehensive recovery rate of the U, the Th and the RE is improved.

4. The extraction raffinate waste acid is recycled, so that the emission of waste water is reduced, the consumption of sulfuric acid and fresh water and the treatment cost of the waste water are reduced, the production cost is reduced, the recovery rate of the valuable elements, namely the uranium, the thorium and the rare earth is more than 97%, and the whole process has no emission of the radioactive waste water and waste slag.

DETAILED DESCRIPTION OF THE INVENTION

The invention is further illustrated below in combination with embodiments. The percentage in the embodiments refers to mass percentage. An analytical method for rare earth and thorium adopts GB/T18114. 1-2000, an analytical method for uranium adopts an EJ/T266 standard, and titration is performed through ferrous sulfate reduction/potassium dichromate oxidation.

Embodiment 1:

A separation and recovery method for monazite slag comprises the following steps: (1) Acid leaching: adding monazite slag into a 0.25 mol/L-0.5 mol/L sulfuric acid solution according to a monazite slag (kg)/acid (L) of 1:(1-15), heating to 40° C.-100° C., stirring for 5 h-8 h, cooling, standing, clarifying for 4 h-8 h, and siphoning the supernatant liquid to obtain a solution containing valuable elements, namely uranium, thorium and rare earth;

In this embodiment, the monazite slag ($H_2O$: 30.80%, $ThO_2$%: 24.2%, REO %: 9.65% and U %: 0.77%) is added into a reaction kettle containing a 0.25 mol/L sulfuric acid solution according to a monazite slag (kg)/acid (L) ratio of 1:10, heated to 55° C., stirred for 5 h, cooled, stood and clarified till the supernatant liquid is clear, the standing time is 5 h, the supernatant liquid is siphoned into a storage tank, and the solid phase is retained in the reaction kettle.

(2) Pressure filtration: pumping slurry (the solid phase retained in the reaction kettle) after siphoning of the supernatant liquid into a plate-and-frame filter press by a pump, performing pressure filtration till no solution flows out, and merging filtrate with the supernatant liquid in the step (1);

(3) Water washing: adding water into filtration slag of the plate-and-frame filter press for washing, stopping adding the water till the pH value of the filtrate is 2-3, dry-pressing the filtration slag, and merging a water washing solution with the supernatant liquid in the step (1) to obtain the clear water solution containing the uranium, the thorium and the rare earth, and filtration slag containing monazite, zirconite and other ores, as well as the remaining uranium, thorium and rare earth compounds;

In this embodiment, the water is used for washing the filtration slag. The adding of the water is stopped till the pH value of the filtrate is 3, the filtration slag is dry-pressed, the washing filtrate is sent into the storage tank to obtain the clear water solution containing the uranium, the thorium and the rare earth. Stirring and uniform mixing are performed, and sampling analysis is further performed (the analytic method for the rare earth and the thorium adopts GB/T18114.1-2000; and the analytical method for the uranium adopts the EJ/T266 standard, and titration is performed through ferrous sulfate reduction/potassium dichromate oxidation). According to the calculation, the leaching rate of the uranium is 78%, the leaching rate of the thorium is 80% and the leaching rate of the rare earth is 45%.

Embodiment 2

Extraction of the valuable components is performed on the mixed water solution containing the uranium, the thorium and the rare earth elements, obtained in the step (3) of the embodiment 1:

(1) Uranium extraction: extracting the uranium from the clear water solution obtained in the step (3) by adopting an ion exchange adsorption method to obtain solid sodium diuranate and a solution containing the thorium and the rare earth.

Resin treatment: strongly alkaline anion resin is washed with pure water till no pigments exist, and soaked in the pure water for 24 h, and periodically stirred in the period; then is soaked with 5% NaOH for 24 h, periodically stirred in the period, washing off alkali-soluble impurities in the resin, then washed with the pure water to neutral. Finally, the resin is soaked with 5% $H_2SO_4$ for 24 h, continuously stirred in the period, washed off acid-soluble impurities in the resin, and washed with the pure water to neutral; then soaked to acidic with 0.15 mol/L $H_2SO_4$, and loaded respectively into two series-connected columns (Φ600 mm and 1500 mm long) for later use, wherein the height of the resin is 1100 mm.

Resin adsorption: enabling the clear water solution containing the uranium, the thorium and the rare earth obtained in the step (3), to flow from the storage tank into the resin at a linear speed of 3 mm/min, and adsorbing the uranium till the resin is saturated, wherein effluent solution contains the rare earth and the thorium.

Washing: washing the resin with 0.25 mol/L $H_2SO_4$ so as to wash the free rare earth and thorium in the resin till sampling analysis of the effluent solution shows that no thorium or rare earth exists, and merging the washing solution with the effluent solution in the previous step for extraction and separation of the thorium.

Leaching: preparing a solution containing 1 mol/L NaCl and 5% $H_2SO_4$ (namely a leaching solution is a mixed solution of NaCl and $H_2SO_4$, the concentration of the NaCl in the mixed solution is 1 mol/L and the mass concentration of the $H_2SO_4$ is 5%), and leaching the uranium in the resin till the leaching solution has no yellow.

Hydrolysis and drying: stirring the leaching solution obtained in the previous step while heating to 80° C., adding a 4 mol/L NaOH solution till pH=10, precipitating sodium diuranate, stirring at a constant temperature for 30 min, standing for 20 min and filtering; and washing a sodium diuranate precipitate with hot water of 80° C., performing centrifugal dehydration to obtain the crystalline sodium diuranate, and drying the crystalline sodium diuranate at 90° C. to obtain a solid sodium diuranate product, wherein the yield of the uranium is 99%.

(2) Thorium extraction: extracting the thorium from the solution containing the thorium and the rare earth in the previous step by adopting an extraction method to obtain solid thorium hydroxide and a rare earth solution.

In the extraction of the thorium according to the invention, an extraction agent is an organic reagent formed by mixing di(2-ethylhexyl)phosphoric acid and kerosene, namely the organic reagent is obtained by stirring and uniformly mixing 25%-35% of P204 (the mass percent or the volume percent of the P204 in the organic reagent is 25%-35%) and the balance of kerosene.

Extraction: respectively adding the organic reagent, the material after uranium removal in the previous step and sulfuric acid (2 mol/L-3 mol/L) into first-stage, sixth-stage and tenth-stage balanced 1.5 L extraction tanks according to a flow ratio that organic reagent:material after uranium removal:sulfuric acid=45:110:20 (ml/min) for cascade extraction and washing to obtain a thorium-loaded organic phase and a thorium-free extraction raffinate rare earth solution.

Back extraction: preparing a 3 mol/L NaOH solution, heating to 75° C., adding the heated NaOH into the hot thorium-loaded organic phase under stiffing conditions, stirring for 30 min, standing for stratification, separating out the lower precipitate, filtering, retaining alkali water for recycling, and recycling the organic phase with 2 mol/L $H_2SO_4$ through an acid method; and washing a filter cake with hot water, and dehydrating to obtain thorium hydroxide, wherein the yield of the thorium is more than 98%.

(3) Rare earth extraction: extracting the rare earth from the rare earth solution in the previous step by adopting an extraction method to obtain a rare earth chloride solution and a waste acid solution;

In the extraction of the rare earth according to the invention, an extraction agent is an organic reagent of mixed primary amine, secondary octanol and kerosene, namely the organic reagent is obtained by stiffing and uniformly mixing 5%-15% of N1923 (the mass percent or the volume percent of the N1923 in the organic reagent is 25%-35%), 3%-6% of secondary octanol (the mass percent or the volume percent of the secondary octanol in the organic reagent is 3%-6%) and the balance of kerosene.

(4) Extraction: respectively adding the organic reagent, the extraction raffinate rare earth solution obtained in the previous step and hydrochloric acid (1 mol/L-2 mol/L) into first-stage, sixth-stage and tenth-stage balanced extraction tanks according to a flow ratio that organic reagent:extraction raffinate:hydrochloric acid=40:120:25 (ml/min) for cascade extraction and back extraction to obtain a back extraction solution, namely the rare earth chloride solution, wherein the yield of the rare earth is more than 99%.

In order to reduce the discharge of industrial waste water and save the production cost, the waste acid solution produced in the step (4), namely the extraction raffinate, is returned to the step (1) for being used as an acid leaching solution in the invention.

Embodiment 3:

Treatment is performed on the secondary slag obtained in the step (3) of the embodiment 1: performing ore dressing on the secondary slag in the step (3) to obtain monazite concentrate, zirconite concentrate and tailings, sending the tailings into a monazite concentrate treatment process for treatment after alkali decomposition of tailings, and further sending the monazite slag produced by the monazite concentrate treatment process into the step (1) for treatment, so that the closed-loop circulation and recovery of the radioactive substances is realized and the production process has no discharge of radioactive waste slag.

In this embodiment, gravity separation, electric separation and magnetic separation are performed on 100 Kg of filtration slag to obtain 11.5 Kg of monazite concentrate with the grade of 60%, 32.5 Kg of zirconite concentrate with the grade of 60% and 54 Kg of tailings, the monazite concentrate is sent to the monazite concentrate treatment process for treatment, and the zirconite concentrate can be directly sold. The monazite slag produced by the monazite concentrate treatment process is further sent into the step (1) for treatment, so that the closed-loop circulation and recovery of the radioactive substances is realized and the production process has no discharge of radioactive waste slag.

Alkali decomposition, water washing, acid dissolution and pressure filtration are performed on the tailings (54 Kg) to obtain filtrate containing the uranium, the thorium and the rare earth and filtration slag, and the filtrate is returned to the monazite concentrate treatment process for treatment to realize closed-loop circulation; and 11 kg of produced filtration slag is zirconite (physical phase analysis shows that the content of zircon is 91.52%), and the filtration slag can be directly sold.

Embodiment 4:

In order to improve the recovery rate of the valuable elements, namely the uranium, the thorium and the rare earth, a secondary acid leaching is performed after the step (1) of the embodiment 1 in the invention by adding a 0.25 mol/L-0.5 mol/L sulfuric acid solution into the slurry after siphoning of the supernatant liquid according to a monazite slag (kg)/acid (L) ratio of 1:(1-3), heating to 40° C.-100° C., stirring for 5 h-8 h, cooling, standing, clarifying for 4 h-8 h, siphoning the supernatant liquid, and merging with the supernatant liquid obtained in the step (1) to obtain a solution containing the valuable elements, namely the uranium, the thorium and the rare earth.

In this embodiment, after the step (1) of the embodiment 1, a 0.25 mol/L sulfuric acid solution is added into the slurry after siphoning of the supernatant liquid according to a monazite slag (kg)/acid (L) ratio of 1:2, heated to 60° C., stirred for 5 h, cooled, stood and clarified for 6 h, then the supernatant liquid is siphoned and merged with the supernatant liquid obtained in the step (1) to obtain the solution containing the valuable elements, namely the uranium, the thorium and the rare earth, and the solid phase is retained in a reaction kettle.

Acid washing is performed after secondary acid leaching in the invention by adding a 0.10 mol/L-0.25 mol/L sulfuric acid solution into the slurry after siphoning of the supernatant liquid according to a monazite slag (kg)/acid (L) ratio of 1:(1-3), heating to 40° C.-100° C., stirring for 0.5 h-1 h, cooling, standing, clarifying for 4 h-8 h, siphoning the supernatant liquid, and merging with the supernatant liquid obtained in the step (1) to obtain the solution containing the valuable elements, namely the uranium, the thorium and the rare earth.

In this embodiment, after the secondary acid leaching, a 0.10 mol/L sulfuric acid solution is added into the slurry after siphoning of the supernatant liquid according to a monazite slag (kg)/acid (L) ratio of 1:1, heated to 50° C., stirred for 0.5 h, cooled, stood and clarified for 4 h. The supernatant liquid thereof is siphoned and merged with the supernatant liquid obtained in the step (1) to obtain the solution containing the valuable elements, namely the uranium, the thorium and the rare earth, and the solid phase is retained in the reaction kettle.

Sampling analysis shows that the leaching rate of the uranium is 82.5%, the leaching rate of the thorium is 86% and the leaching rate of the rare earth is 58.8%.

Embodiment 5:

Treatment is performed on the secondary slag after dry pressing in the step (3): performing gravity separation, electric separation and magnetic separation on 100 Kg of secondary slag to obtain 12.4 Kg of monazite concentrate with the grade of 60%, 34.8 Kg of zirconite concentrate with the grade of 60% and 52 Kg of tailings, wherein the monazite concentrate is sent to the monazite concentrate treatment process for treatment, and the zirconite concentrate can be directly sold. The monazite slag produced by the monazite concentrate treatment process is further sent into the step (1) for treatment, so that the closed-loop circulation and recovery of the radioactive substances is realized and the production process has no discharge of radioactive waste slag.

Alkali decomposition, water washing, acid dissolution and pressure filtration are performed on the tailings (52 Kg) to obtain filtrate containing the uranium, the thorium and the rare earth and filtration slag, and the filtrate is returned to the monazite concentrate treatment process for treatment to realize closed-loop circulation; and 11.3 kg of produced filtration slag is zirconite (physical phase analysis shows that the content of zircon is 91.52%), and the filtration slag can be directly sold.

The other performance of this embodiment is the same as that of the embodiment 1.

Embodiment 6:

In the step (1) of this embodiment, the monazite slag is added into a reaction kettle containing a 0.25 mol/L sulfuric acid solution according to a monazite slag (kg)/acid (L) ratio of 1:12, heated to 60° C., stirred for 6 h, cooled, stood and clarified till the supernatant liquid is clear, the standing time is 6 h, the supernatant liquid is siphoned into a storage tank, and the solid phase is retained in the reaction kettle.

In order to improve the recovery rate of the valuable elements, namely the uranium, the thorium and the rare earth, a secondary acid leaching is performed after the step (1) in the invention by adding a 0.35 mol/L sulfuric acid solution into the slurry after siphoning of the supernatant liquid according to a monazite slag (kg)/acid (L) of 1:1.5, heating to 80° C., stirring for 5 h, cooling, standing, clarifying for 6 h, siphoning the supernatant liquid, merging with the supernatant liquid obtained in the step (1) to obtain the solution containing the valuable elements, namely the uranium, the thorium and the rare earth, and retaining the solid phase in the reaction kettle.

Acid washing is performed after secondary acid leaching in the invention by adding a 0.10 mol/L sulfuric acid solution into the slurry after siphoning of the supernatant liquid according to a monazite slag (kg)/acid (L) ratio of 1:2, heating to 80° C., stirring for 1.0 h, cooling, standing, clarifying for 8 h, siphoning the supernatant liquid, merging with the supernatant liquid obtained in the step (1) to obtain the solution containing the valuable elements, namely the uranium, the thorium and the rare earth and retaining the solid phase in the reaction kettle.

In the step (3) of the invention, the filtration slag is washed with water, the adding of the water is stopped till the pH value of the filtrate is 2.5, the filtration slag is dry-pressed, the washing filtrate is sent into the storage tank to obtain the clear water solution containing the uranium, the thorium and the rare earth, stirring and uniform mixing are performed, sampling analysis is further performed, and according to the calculation, the leaching rate of the uranium is 83.5%, the leaching rate of the thorium is 87.2% and the leaching rate of the rare earth is 61.0%.

Treatment is performed on the filtration slag after dry pressing in the step (3): performing gravity separation, electric separation and magnetic separation on 100 Kg of filtration slag to obtain 12.7 Kg of monazite concentrate with the grade of 60%, 36.7 Kg of zirconite concentrate with the grade of 60% and 49.6 Kg of tailings, wherein the monazite concentrate is sent to the monazite concentrate treatment process for treatment, and the zirconite concentrate can be directly sold. The monazite slag produced by the monazite concentrate treatment process is further sent into the step (1) for treatment, so that the closed-loop circulation and recovery of the radioactive substances is realized and the production process has no discharge of radioactive waste slag.

Alkali decomposition, water washing, acid dissolution and pressure filtration are performed on the tailings (49.6 Kg) to obtain filtrate containing the uranium, the thorium and the rare earth and filtration slag, and the filtrate is returned to the monazite concentrate treatment process for treatment to realize closed-loop circulation; and 11.5 kg of produced filtration slag is zirconite (physical phase analysis shows that the content of zircon is 91.52%), and the filtration slag can be directly sold. The other performance of this embodiment is the same as that of embodiment 1.

Embodiment 7:

In the step (1) of this embodiment, the monazite slag is added into a reaction kettle containing a 0.3 mol/L sulfuric acid solution according to a monazite slag (kg)/acid (L) ratio of 1:8, heated to 65° C., stirred for 7 h, cooled, stood and clarified till the supernatant liquid is clear, the standing time is 7 h, the supernatant liquid is siphoned into a storage tank, and the solid phase is retained in the reaction kettle.

In order to improve the recovery rate of the valuable elements, namely the uranium, the thorium and the rare earth, a secondary acid leaching is performed after the step (1) in the invention by adding a 0.5 mol/L sulfuric acid solution into the slurry after siphoning of the supernatant liquid according to a monazite slag (kg)/acid (L) ratio of 1:3, heating to 90° C., stirring for 5 h, cooling, standing, clarifying for 6 h, siphoning the supernatant liquid, merging with the supernatant liquid obtained in the step (1) to obtain the solution containing the valuable elements, namely the uranium, the thorium and the rare earth, and retaining the solid phase in the reaction kettle.

Acid washing is performed after secondary acid leaching in the invention by adding a 0.25 mol/L sulfuric acid solution into the slurry after siphoning of the supernatant liquid according to a monazite slag (kg)/acid (L) ratio of 1:2, heating to 90° C., stirring for 1.0 h, cooling, standing, clarifying for 8 h, siphoning the supernatant liquid, merging with the supernatant liquid obtained in the step (1) to obtain the solution containing the valuable elements, namely the uranium, the thorium and the rare earth and retaining the solid phase in the reaction kettle.

In the step (3) of the invention, the filtration slag is washed with water, the adding of the water is stopped till the pH value of the filtrate is 2.0, the filtration slag is dry-pressed, the washing filtrate is sent into the storage tank to obtain the clear water solution containing the uranium, the thorium and the rare earth, stirring and uniform mixing are performed, sampling analysis is further performed, and according to the calculation, the leaching rate of the uranium is 85.5%, the leaching rate of the thorium is 88.0% and the leaching rate of the rare earth is 65.5%.

Treatment is performed on the filtration slag after dry pressing in the step (3): performing gravity separation, electric separation and magnetic separation on 100 Kg of filtration slag to obtain 12.9 Kg of monazite concentrate with the grade of 60%, 36.4 Kg of zirconite concentrate with the grade of 60% and 49.3 Kg of tailings, wherein the monazite concentrate is sent to the monazite concentrate treatment process for treatment, and the zirconite concentrate can be directly sold. The monazite slag produced by the monazite concentrate treatment process is further sent into the step (1) for treatment, so that the closed-loop circulation and recovery of the radioactive substances is realized and the production process has no discharge of radioactive waste slag.

Alkali decomposition, water washing, acid dissolution and pressure filtration are performed on the tailings (49.3 Kg) to obtain filtrate containing the uranium, the thorium and the rare earth and filtration slag, and the filtrate is returned to the monazite concentrate treatment process for treatment to realize closed-loop circulation; and 11.8 kg of the produced filtration slag is zirconite (physical phase analysis shows that the content of zircon is 91.52%), and the filtration slag can be directly sold.

The other performance of this embodiment is the same as that of embodiment 1.

Embodiment 8:

In the step (1) of this embodiment, the monazite slag is added into a reaction kettle containing a 0.45 mol/L sulfuric acid solution according to a monazite slag (kg)/acid (L) ratio of 1:7, heated to 70° C., stirred for 8 h, cooled, stood and clarified till the supernatant liquid is clear, the standing time is 8 h, the supernatant liquid is siphoned into a storage tank, and the solid phase is retained in the reaction kettle.

Secondary acid leaching is performed after the step (1) in the invention by adding a 0.5 mol/L sulfuric acid solution into the slurry after siphoning of the supernatant liquid according to a monazite slag (kg)/acid (L) ratio of 1:3, heating to 90° C., stirring for 5 h, cooling, standing, clarifying for 8 h, siphoning the supernatant liquid, merging with the supernatant liquid obtained in the step (1) to obtain the solution containing the valuable elements, namely the uranium, the thorium and the rare earth, and retaining the solid phase in the reaction kettle.

Acid washing is performed after secondary acid leaching in the invention by adding a 0.25 mol/L sulfuric acid solution into the slurry after siphoning of the supernatant liquid according to a monazite slag (kg)/acid (L) ratio of 1:2, heating to 90° C., stirring for 1.0 h, cooling, standing, clarifying for 8 h, siphoning the supernatant liquid, merging with the supernatant liquid obtained in the step (1) to obtain the solution containing the valuable elements, namely the uranium, the thorium and the rare earth, and retaining the solid phase in the reaction kettle.

In the step (3) of the invention, the filtration slag is washed with water, the adding of the water is stopped till the pH value of the filtrate is 3.0, the filtration slag is dry-pressed, the washing filtrate is sent into the storage tank to obtain the clear water solution containing the uranium, the thorium and the rare earth, stirring and uniform mixing are performed, sampling analysis is further performed, and according to the calculation, the leaching rate of the uranium is 88.5%, the leaching rate of the thorium is 89.0% and the leaching rate of the rare earth is 67.0%.

Treatment is performed on the filtration slag after dry pressing in the step (3): performing gravity separation, electric separation and magnetic separation on 100 Kg of filtration slag to obtain 13.0 Kg of monazite concentrate with the grade of 60%, 36.8 Kg of zirconite concentrate with the grade of 60% and 49 Kg of tailings, wherein the monazite concentrate is sent to the monazite concentrate treatment process for treatment, and the zirconite concentrate can be directly sold. The monazite slag produced by the monazite concentrate treatment process is further sent into the step (1) for treatment, so that the closed-loop circulation and recovery of the radioactive substances is realized and the production process has no discharge of radioactive waste slag.

Alkali decomposition, water washing, acid dissolution and pressure filtration are performed on the tailings (49) to obtain filtrate containing the uranium, the thorium and the rare earth and filtration slag, and the filtrate is returned to the monazite concentrate treatment process for treatment to realize closed-loop circulation; and 11.9 kg of the produced filtration slag is zirconite (physical phase analysis shows that the content of zircon is 91.52%), and the filtration slag can be directly sold.

The other performance of this embodiment is the same as that of embodiment 1.

The invention claimed is:

1. A method for recovering substances from monazite slag, comprising the following steps:
    (i) adding monazite slag into a 0.25 to 0.5 molar solution of inorganic strong acid according to a monazite slag/acid ratio of 1 kg slag/1 to 15 L acid solution to form a mixture, heating the mixture to 40° C.-100° C., stirring the mixture for 5-8 hours, cooling the mixture, standing the mixture to obtain a first supernatant liquid containing uranium, thorium and rare earth elements and a slurry, and recovering the first supernatant liquid;
    (ii) filtering the slurry to obtain filtration slag and filtrate, and combining the filtrate with the first supernatant liquid obtained in step (i) to obtain a second supernatant;
    (iii) washing the filtration slag with water, stopping washing when the pH value of a water washing solution is 2-3, and dry-pressing the filtration slag to obtain a water washing solution and a secondary slag; and
    (iv) combining the water washing solution with the second supernatant liquid obtained in step (ii) to obtain a mixed water solution comprising uranium, thorium and rare earth elements.

2. The method according to claim 1, further comprising, after step (i), the steps of:
    (ia) adding a 0.25 to 0.5 molar solution of inorganic strong acid solution into the slurry according to a monazite slag/acid ratio of 1 kg slag/1 to 3 L acid solution, heating the slurry to 40° C.-100° C., stirring the slurry for 5-8 hours, cooling the slurry, standing the slurry to obtain a secondary leaching supernatant liquid containing uranium, thorium and rare earth elements and a slurry, recovering the secondary leaching supernatant liquid, and combining the secondary leaching supernatant with the first supernatant or the second supernatant or the mixed water solution.

3. The method according to claim 2, further comprising performing, after the steps (ia), steps of:
    (ib) adding a 0.1 to 0.25 molar solution of inorganic strong acid into the slurry according to a monazite slag/acid ratio of 1 kg slag to 1 to 3 L acid solution, heating the slurry to 40° C.-100° C., stirring for 0.5-1 hour, cooling the slurry, standing the slurry to obtain a third supernatant liquid comprising uranium, thorium and rare earth elements and a slurry, recovering the third supernatant liquid, and combining the third supernatant liquid with the first supernatant, the second supernatant or the mixed water solution.

4. The method according to claim 1, wherein the cooling and standing time is more than 4 hours.

5. The method according to claim 1, wherein the inorganic strong acid is sulfuric acid or nitric acid.

6. The method according to claim 1, further comprising extracting one or more substances from the mixed water solution containing the uranium, the thorium and the rare earth elements, obtained in the (iv) by steps of:

(a) extracting uranium from the mixed water solution obtained in the (iv) by an ion exchange adsorption method to obtain solid sodium diuranate and a solution containing thorium and rare earth elements;

(b) extracting thorium using a mixture of mixed di(2-ethylhexyl)phosphoric acid and kerosene as an extraction agent, wherein the mass percent of the di(2-ethylhexyl)phosphoric acid in the mixture is 25%-35%; to obtain solid thorium hydroxide and a solution of rare earth elements; and (c) extracting rare earth elements using a mixture comprising 5% to 15% by mass of mixed primary amines, 3% to 6% by mass of secondary octanol and a balance of kerosene as an extraction agent, and extracting rare earth elements from the solution of rare earth elements obtained in step (b) to obtain a rare earth chloride solution and a waste acid solution.

7. The method according to claim 6, wherein the waste acid solution produced in the step (c) is returned to (i) for being used as an acid leaching solution.

8. The method according to claim 6, further comprising the steps of performing treatment on the secondary slag obtained in the step (iii) by the steps of:

performing ore dressing on the secondary slag to obtain a monazite concentrate, a zirconite concentrate and tailings, sending the tailings into a monazite concentrate treatment process for treatment after alkali decomposition, and further sending a monazite slag produced by the monazite concentrate treatment process into the step (i) for treatment.

* * * * *